United States Patent
Anchala et al.

(10) Patent No.: US 12,009,905 B2
(45) Date of Patent: Jun. 11, 2024

(54) DYNAMIC CELLULAR NETWORK INTERFERENCE MANAGEMENT

(71) Applicant: DISH Wireless L.L.C., Englewood, CO (US)

(72) Inventors: Aravind Anchala, Reston, VA (US); Siddhartha Chenumolu, Ashburn, VA (US); Gurpreet Sohi, Parker, CO (US); Dhaval Mehta, Aldie, VA (US)

(73) Assignee: DISH Wireless L.L.C., Littleton, CO (US)

( * ) Notice: Subject to any disclaimer, the term of this patent is extended or adjusted under 35 U.S.C. 154(b) by 248 days.

(21) Appl. No.: 17/550,390

(22) Filed: Dec. 14, 2021

(65) Prior Publication Data

US 2023/0188200 A1    Jun. 15, 2023

(51) Int. Cl.
*H04B 7/185* (2006.01)
*H04W 72/04* (2023.01)

(52) U.S. Cl.
CPC ........ *H04B 7/18515* (2013.01); *H04W 72/04* (2013.01)

(58) Field of Classification Search
CPC ............ H04B 7/18515; H04B 7/18513; H04B 7/18519; H04W 72/04; H04W 56/0005; H04W 56/0045
See application file for complete search history.

(56) References Cited

U.S. PATENT DOCUMENTS

| | | | |
|---|---|---|---|
| 2016/0050676 A1* | 2/2016 | Sinnaduray | H04L 5/00 370/329 |
| 2021/0273719 A1* | 9/2021 | Wang | H04B 7/18519 |
| 2022/0377759 A1* | 11/2022 | Simonen | H04W 72/20 |

* cited by examiner

*Primary Examiner* — Rushil P. Sampat
(74) *Attorney, Agent, or Firm* — Kilpatrick Townsend & Stockton LLP (57) ABSTRACT

Various arrangements for performing dynamic resource blanking on a cellular network to prevent satellite communication interference are provided. Interference modelling can be provided by a satellite operator that operates a satellite. A cellular network can receive orbital data for the satellite. Based upon the orbital data for the satellite and the interference modelling, the cellular network can blank physical resource blocks (PRBs) for uplink communication with various base stations.

18 Claims, 5 Drawing Sheets

DYNAMIC CELLULAR NETWORK INTERFERENCE MANAGEMENT

BACKGROUND

As radio spectrum becomes more heavily used, it can be possible to reuse particular frequencies. A first entity may have the senior rights to a frequency band (or particular frequency). A second entity may be permitted to operate on the same frequency band as long as little or no interference with the first entity results. Such an arrangement may be possible if the first entity only uses the frequency band in a relatively small geographic area at specific times. Outside of the geographic area, the second entity can also use the frequency band without interfering with the first entity's use.

SUMMARY

Various embodiments are described related to a method for performing dynamic resource blanking on a cellular network. In some embodiments, a method for performing dynamic resource blanking on a cellular network is described. The method may comprise receiving, by the cellular network, interference modelling from a satellite operator that operates a satellite. The method may comprise receiving, by the cellular network, orbital data for the satellite. The satellite may utilize a first frequency band. The orbital data may be indicative of an orbit of the satellite around the Earth. The method may comprise, based upon the orbital data for the satellite and the interference modelling, blanking, by the cellular network, a plurality of physical resource blocks (PRBs) for uplink communication with a first plurality of base stations. The method may comprise, based upon the orbital data for the satellite and the interference modelling, disabling, by the cellular network, a second frequency band at one or more base stations.

Embodiments of such a method may include one or more of the following features: receiving, by the cellular network, from an operator of the satellite, interference feedback. The method may further comprise, in response to the interference feedback, blanking, by the cellular network, the plurality of PRBs for uplink communication with a second plurality of base stations. The method may further comprise, in response to the interference feedback, assigning a base station of the first plurality of base stations to disable the second frequency band for future pass-overs of the satellite. The method may further comprise, in response to the interference feedback, blanking, by the cellular network, a second plurality of PRBs at the first plurality of base stations. The cellular network may be a 5G New Radio (NR) cellular network. The orbital data may be indicative of a schedule of when the satellite may be within a line of sight of a satellite receiver base station. The orbital data may be indicative of an algorithm for calculating when the satellite may be within a line of sight of a satellite receiver base station. The method may further comprise determining, by the cellular network, a plurality of user equipment (UE) each conducting an active call using the second frequency band at the one or more base stations in response to the orbital data for the satellite. The method may further comprise, for each UE of the plurality of UE, performing, by the cellular network, a handover of the active call to a different frequency band. Disabling the second frequency band at the one or more base stations may be performed following completion of the handover of the active call for each UE of the plurality of UE. The method may further comprise initiating, by the cellular network, a satellite pass-over timer based on the orbital data. The method may further comprise determining, by the cellular network, that the satellite pass-over timer has expired. The method may further comprise, based upon determining the satellite pass-over timer having expired, enabling, by the cellular network, the second frequency band at the one or more base stations. The method may further comprise initiating, by the cellular network, a satellite pass-over timer based on the orbital data. The method may further comprise determining, by the cellular network, that the satellite pass-over timer has expired. The method may further comprise, based upon determining the satellite pass-over timer having expired, assigning, by the cellular network, the plurality of PRBs for uplink communication with the first plurality of base stations.

In some embodiments, a cellular network system is described. The system may comprise a 5G New Radio (NR) cellular network comprising a first plurality of base stations. The system may comprise a cellular network interference management system that functions as part of the 5G NR cellular network. The cellular network interference management system may be configured to receive interference modelling from a satellite operator that operates a satellite. The cellular network interference management system may be configured to receive orbital data for the satellite. The satellite may utilize a first frequency band. The orbital data may be indicative of an orbit of the satellite around the Earth. The cellular network interference management system may be configured to, based upon the orbital data for the satellite and the interference modelling, cause a plurality of physical resource blocks (PRBs) for uplink communication with the first plurality of base stations to be blanked by the 5G NR cellular network. The cellular network interference management system may be configured to, based upon the orbital data for the satellite and the interference modelling, cause the 5G NR cellular network, a second frequency band to be disabled at one or more base stations of the 5G NR cellular network.

Embodiments of such a system may include one or more of the following features: a satellite management system, operated by the satellite operator, that may provide interference feedback to the cellular network interference management system. The cellular network interference management system may be further configured to cause the 5G NR cellular network to blank the plurality of PRBs for uplink communication with a second plurality of base stations in response to the interference feedback. The cellular network interference management system may be further configured to cause the 5G NR cellular network to assign a base station of the first plurality of base stations to disable the second frequency band for future pass-overs of the satellite in response to the interference feedback. The cellular network interference management system may be further configured to cause the 5G NR cellular network to blank a second plurality of PRBs at the first plurality of base stations in response to the interference feedback. The orbital data may be indicative of a schedule of when the satellite may be within a line of sight of a satellite receiver base station. The 5G NR cellular network may be configured to determine a plurality of user equipment (UE) each conducting an active call using the second frequency band at the one or more base stations in response to the orbital data for the satellite. The 5G NR cellular network may be configured to, for each UE of the plurality of UE, perform a handover of the active call to a different frequency band. Disabling the second frequency band at the one or more base stations may be performed following completion of the handover of the active call for each UE of the plurality of UE. The 5G NR cellular network may be further configured to initiate a satellite pass-over timer based on the orbital data. The 5G NR cellular network may be further configured to determine that the satellite pass-over timer has expired. The 5G NR cellular network may be further configured to, based upon determining the satellite pass-over timer having expired, enable the second frequency band at the one or more base stations. The 5G NR cellular network may be further configured to initiate a satellite pass-over timer based on the orbital data. The 5G NR cellular network may be further configured to determine that the satellite pass-over timer has expired. The 5G NR cellular network may be further configured to, based upon determining the satellite pass-over timer having expired, assign the plurality of PRBs for uplink communication with the first plurality of base stations.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A situation where multiple entities may have the rights to the same frequency band can involve a senior satellite-based user and a junior cellular network user. The senior satellite user may be an entity that occasionally or periodically operates on a particular frequency band and has senior rights to the frequency band. The junior cellular network user may be permitted to use the same frequency band as long as little (e.g., below a defined threshold value) interference or no interference occurs.

Such an arrangement poses several unique challenges. First, the satellite, which may be in a low or middle earth orbit, moves in relation to the ground. At particularly times, such as when the satellite is within a line-of-sight of a satellite communication station, a significant amount of data may be transmitted from the satellite to the station. Second, the cellular network may use the frequency band for communication (e.g., downlink communication, uplink communication, or both) with many pieces of user equipment (UE). For example, thousands of UE may use the frequency band for uplink communication with one or more base stations (BSs) of the cellular network. Since uplink communication originates from the UE, preventing interference with the satellite user can involve coordination across these thousands of UE.

Embodiments detailed herein can deal with these challenges and others. A feedback arrangement between a satellite operator and the cellular network may be established. Based upon the present location of the satellite, the cellular network may blank particular physical resource blocks (PRBs) for use by UE in a particular geographic region relatively near a satellite communication station. Additionally, an entire frequency band may be disabled in the immediate vicinity of the satellite communication station. If feedback is received from the satellite operator that interference (e.g., above a defined threshold) has been detected, the cellular network can increase the number of base stations at which blanking of PRBs and/or disablement of the frequency band occurs. In some embodiments, the cellular network can expand the number of PRBs at which blanking occurs to decrease any possible emissions leakage that the cellular network is responsible for in the geographic region in which the satellite is operating. In some embodiments, the feedback arrangement may also be used to expand the geographic region in which the PRBs are blanked.

After a time period has elapsed (e.g., as measured by a set timer), the cellular network may be permitted to cease blocking the PRBs and/or enable the frequency band. For instance, once the satellite is no longer in line-of-sight with the satellite communication station, some or all of the potentially interfering PRBs and the frequency band may be made available for use on the cellular network in the vicinity of the station.

Figure 1:
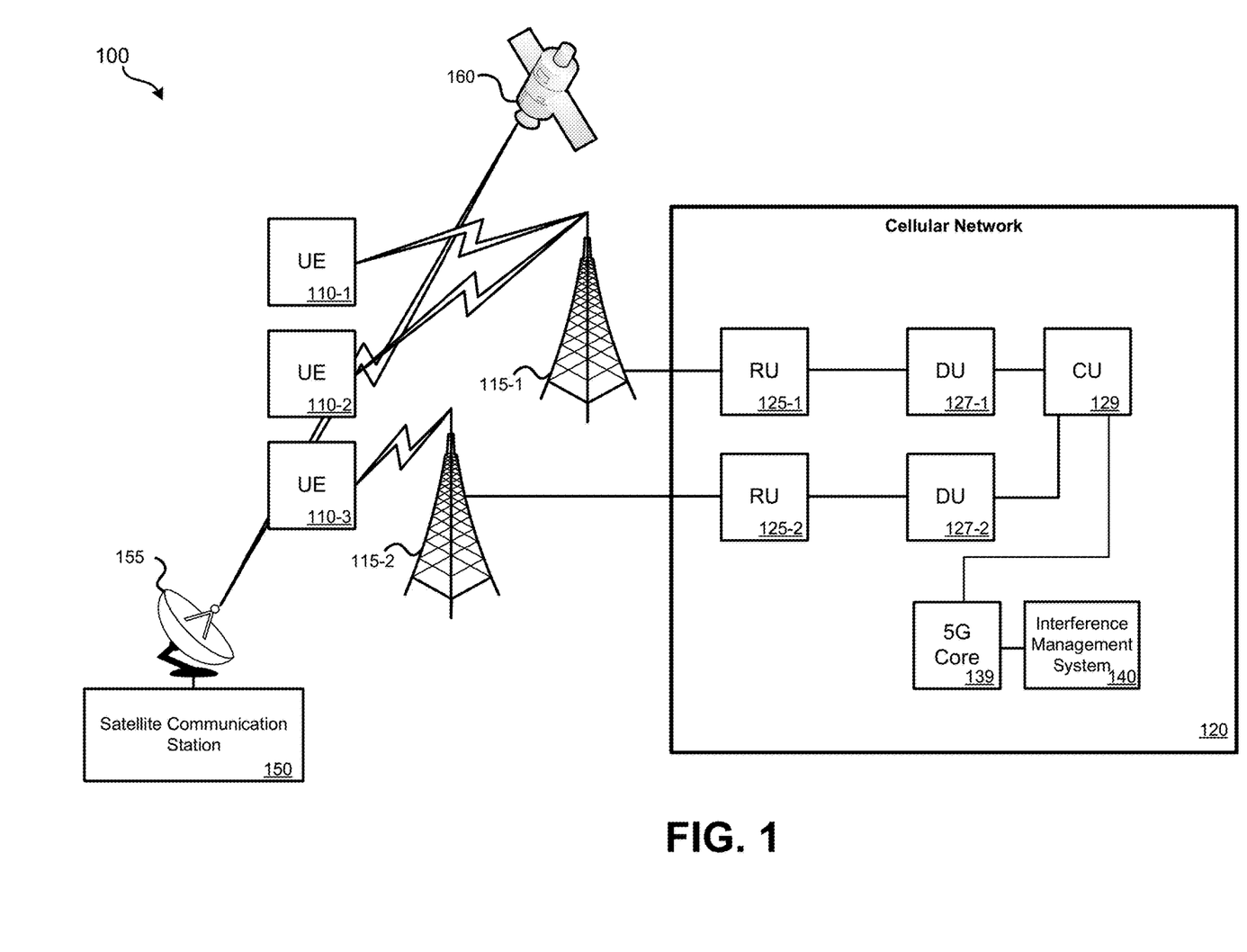
FIG. 1 illustrates a block diagram of an embodiment of a 5G cellular network.

Further detail regarding these and other embodiments is provided in relation to the figures. FIG. 1 illustrates a block diagram of an embodiment of a 5G cellular network system ("system 100"). System 100 can include a 5G New Radio (NR) cellular network or other types of cellular networks that permit slicing are also possible (e.g., future 6G and beyond cellular networks). System 100 can include: UE 110 (UE 110-1, UE 110-2, UE 110-3); base station 115; cellular network 120; radio units 125 ("RUs 125"); distributed units 127 ("DUs 127"); centralized unit 129 ("CU 129"); 5G core 139, and interference management system 140. FIG. 1 represents a component level view. In an open radio access network (O-RAN), because components can be implemented as software on a cloud-computing platform, except for components that need to receive and transmit RF, the functionality of the various components can be shifted among different servers and/or data centers to accommodate where the functionality of such components is needed and/or where processing, storage, and/or bandwidth is available.

UE 110 can represent various types of end-user devices, such as smartphones, cellular modems, cellular-enabled computerized devices, sensor devices, gaming devices, access points (APs), any computerized device capable of communicating via a cellular network, etc. Depending on the location of individual UE, UE 110 may use RF to communicate with various base stations (BSs) of cellular network 120. As illustrated, two base stations 115 (BS 115-1, 115-2) are illustrated. Real-world implementations of system 100 can include many (e.g., thousands) of base stations, RUs, DUs, and CUs. BS 115 can include one or more antennas that allow RUs 125 to communicate wirelessly with UE 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1). In some embodiments, an RU and a DU are co-located at a base station.

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of spectrum, such as, for example, band n71. One or more DUs, such as DU 127-1, may communicate with CU 129. Collectively, RUs, DUs, and CUs serve as the radio access network (RAN) of cellular network 120. CU 129 can communicate with 5G core 139. The specific architecture of cellular network 120 can vary by embodiment.

Multiple slices may function on the underlying hardware detailed in FIG. 1. That is, UE 110-1 and UE 110-2, while communicating with the same base station, may be provided with different QoS/QoE levels of service by virtue of being assigned to different slices. Each slice may be associated with differing performance characteristics. For each slice, many characteristics or parameters may be defined, such as: downlink/uplink throughput (aggregate for network slice); downlink/uplink throughput (per UE); maximum downlink/uplink throughput; maximum supported packet size; mission critical level (e.g., compared to other network slices); radio spectrum; packet error rate; supported access technologies; supported device velocity for a defined QoS; uplink throughput (aggregate for network slice); maximum uplink throughput; and/or synchronicity. Other parameters for a slice may also be defined, such as: a defined latency range for specific end-points; reserved or shared spectrum; one or more particular security profiles; optimization for specific applications or sets of applications (e.g., healthcare applications, industrial applications); optimization for high-speed mobility; and varying degrees of customer-side control of network parameters. Other parameters may also be defined, such as parameters for individual layers within each network slice. Such individual layers may allow for particular types of data or data associated with particular applications to be prioritized over other applications.

Interference management system 140 may be one or more computer servers or a process that hosted on a cloud-based computing platform. Interference management system 140 may be in communication with 5G core 139 and/or other components of cellular network 120. At a high level, interference management system 140 schedules PRB blanking at a cell level and can temporarily disable cellular communication on the frequency band used for satellite communication. Interference management system 140 may also adjust the PRBs, base stations, and timing based on feedback received from the satellite operator. Further detail regarding interference management system 140 is provided in relation to FIG. 3.

Functioning independently of the cellular network can be satellite communication station 150, satellite antenna 155, and satellite 160. Satellite communication station 150, which can also be referred to as an "Earth station," may communicate with satellite 160 via satellite antenna 155 on one or more particular frequency bands. If UE 110 and/or BSs 115 are operating on the same or nearby frequency band (e.g., which may result in out of band emissions), interference can result in satellite communication station 150 and satellite 160 being unable to communicate or can result in decreased quality of service. Satellite 160 may be in a low earth orbit (LEO) or middle earth orbit (MEO) and may only be within a line of sight of the earth station's antenna 155 for short intervals of time. Satellite communication station 150 may also periodically or occasionally communicate with one or more other satellites, possibly using the same or different frequency bands. In the embodiments detailed herein, the operator of satellite communication station 150 and satellite 160 are the senior users of one or more particular frequency bands. Accordingly, the cellular network operator is required to not interfere with the operations of the satellite operator.

Figure 2:
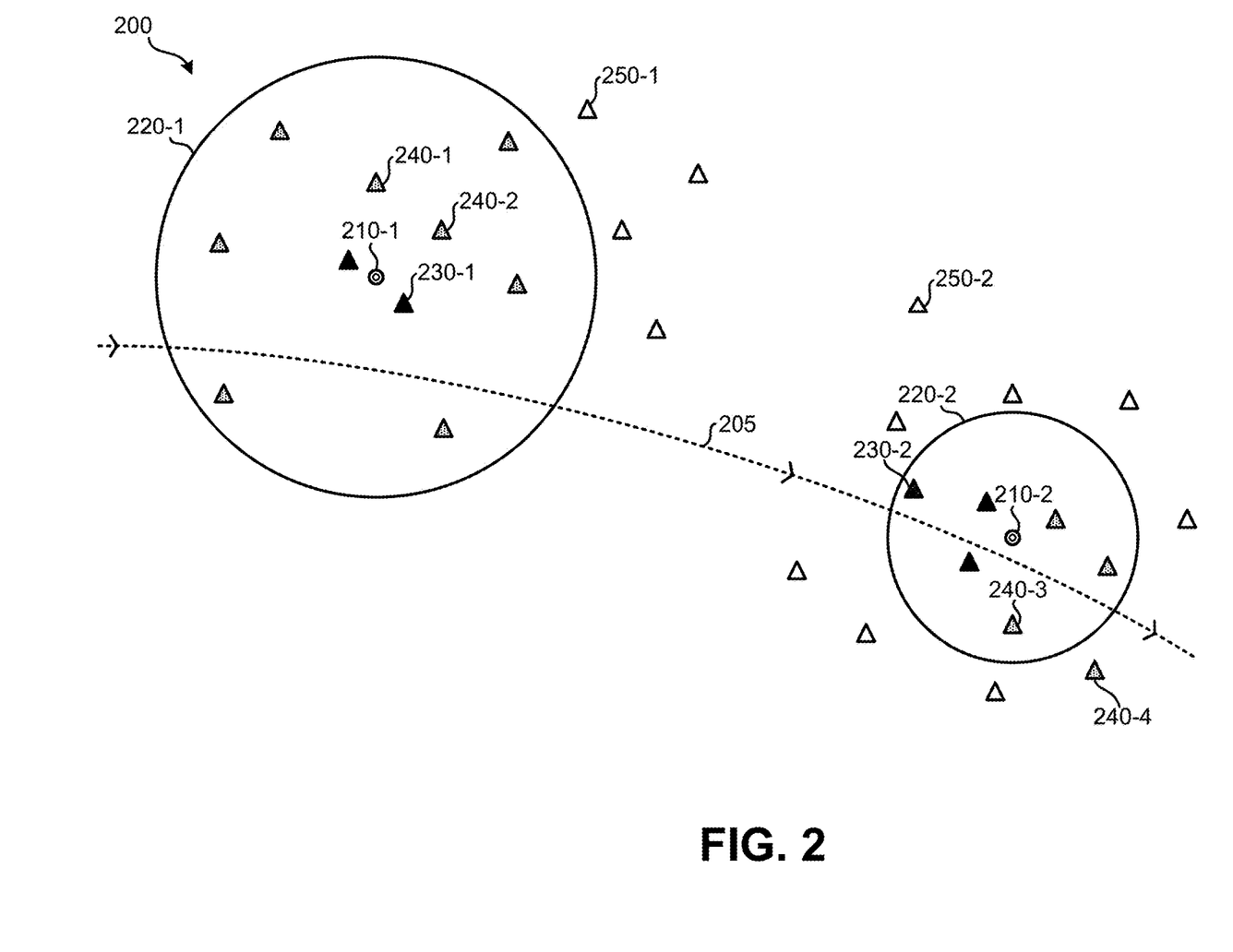
FIG. 2 illustrates a geographical region over which satellite communication stations are located.

FIG. 2 illustrates an embodiment 200 geographical region over which satellite communication stations are operated. In embodiment 200, a satellite antenna and satellite communication station are at location 210-1; a second satellite antenna and a second satellite communication station are at location 210-2. Each of these satellite antennas and communication stations communicate with a satellite while the satellite is within line-of-sight. The satellite follows orbital path 205 over the Earth. While FIG. 2 shows the location of base stations, it should be understood that in some embodiments the sources of interference are uplink communications that originate from UE and are transmitted to the base stations of FIG. 2. As such, to eliminate such interference, coordination across all of the UE (or almost all) of the UE in communication with the base stations relatively nearby locations 210 may be needed.

Earth station's antennas may have different amounts of gain and beam patterns. The gain and directionality can affect how susceptible the signals being received and transmitted by the satellite antenna are to interference. Regions 220 can be defined by the satellite operator and can represent regions within which cellular equipment could potentially interfere with communications between a satellite communication station and a satellite, given the properties of the satellite antenna (and possibly other conditions and equipment). For example, region 220-2 is smaller than region 220-1 because the equipment, including the satellite antenna, at location 210-2 has a higher gain and/or greater directionality, and thus is less susceptible to interference from cellular equipment that is farther away.

Based on regions 220 as defined by the satellite operator, the cellular network operator may be required to provide locations of all base stations located within these regions. Using the locations of the base stations, possibly along with other parameters of the base stations, such as the height, azimuth, electrical tilt and power level, the satellite operator may perform modeling to determine the amount of interference that the base station and/or UE communicating with the base station will cause. Based upon the modeled amount of interference, the cellular network may be provided with at least two classifications of base stations: 1) a first BS classification for base stations at which an entire frequency band is required to be blocked from use when communication is occurring between the satellite and the satellite communication station; and 2) a second BS classification for base stations at which PRB blanking is required to be performed on a more limited range of frequencies when communication is occurring between the satellite and the satellite communication station. In some embodiments, rather than providing modelling on a BS-by-BS basis, modelling may be performed on sector antenna basis for each BS. (A BS can have multiple sector antennas that communicate with UE in different geographic areas.)

In embodiment 200, modelling indicated that the base station 230-1 should have an entire frequency band blocked. While the satellite and satellite communication station may not use the entire frequency band, out of band emissions may cause interference due to the close proximity between base station 230-1 and location 210-1. Other base stations similarly marked with a black triangle in FIG. 2 may also have been identified by the modeling to require the entire frequency band to be blocked. Base stations 240-1, 240-2, and 240-3 may have been identified based on modeling to only require that the actual frequency band used for satellite communication (and possibly an upper and lower guard band) to be blocked. Other base stations similarly marked with dotted triangles in FIG. 2 may also have been identified by the modeling to require a limited blocking arrangement.

Figure 4:
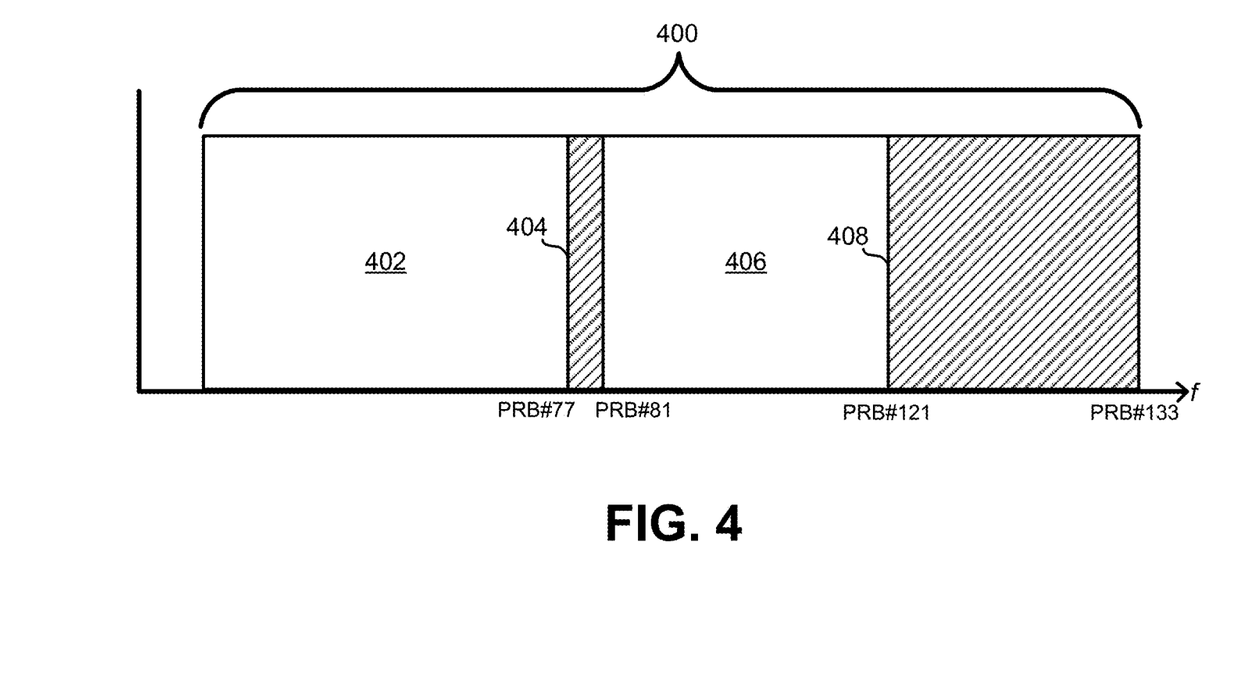
FIG. 4 illustrates an embodiment of frequency bands and physical resource blocks used by a satellite and a cellular network, respectively.

Further detail regarding the difference between the blocking or disablement of a frequency band as compared with a more limited blocking of particular PRBs within a frequency band is provided in relation to FIG. 4.

While modelling may be relatively accurate to determine base stations and/or UE that are in communication with those base stations that are likely to cause interference, real-world measurements may necessitate an adjustment. For example, while base station 230-2 is not as physically proximate to location 210-2 as other base stations, interference measurements made at location 210-2 may indicate that above a threshold amount of interference is originating from either base station 230-2 itself or UE that are in communication with base station 230-2.

Similarly, base station 240-4, which is outside the region for which modelling was initially performed, may either directly or via UE in communication with BS 240-4 cause interference with satellite communication at location 210-2. As such, at BS 240-4, limited PRB blocking may be performed to eliminate interference. In some embodiments, because base station 240-4 is outside the region for which modelling was initially performed, no blanking or other action may be taken.

Base stations marked by a white triangle, such as base stations 250, may not need to perform any actions regarding interference and can use the frequency band for which the satellite operator is the senior user as desired.

Figure 3:
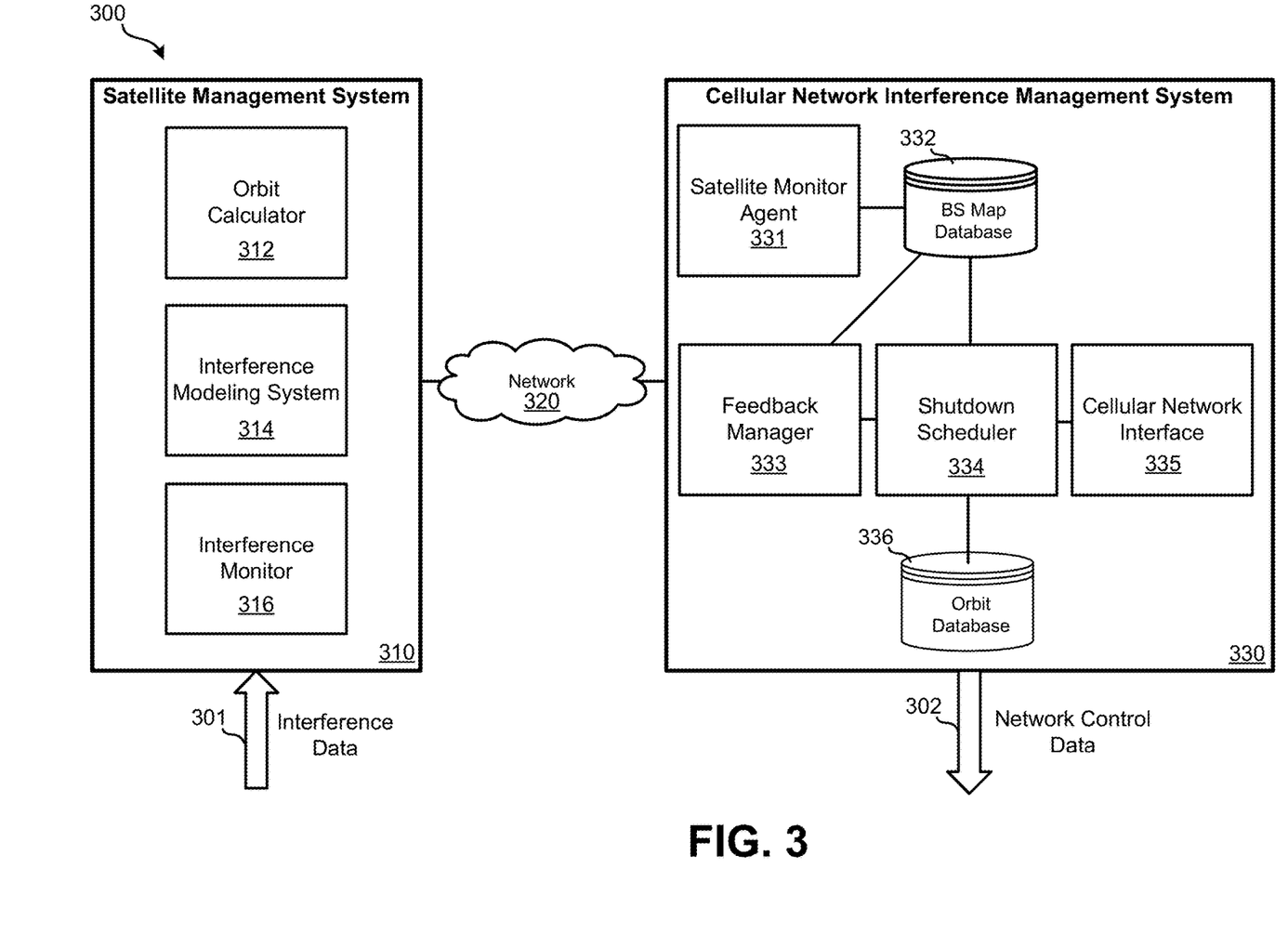
FIG. 3 illustrates an embodiment of a satellite blanking system that can be integrated with a cellular network.

FIG. 3 illustrates an embodiment of a satellite coordination system 300 ("system 300") that can be integrated with a cellular network. System 300 can include satellite management system 310; network 320; and cellular network interference management system 330 ("system 330").

Satellite management system 310 can be incorporated as part of a satellite communication station, such as satellite communication station 150 or at a centralized server system that performs monitoring for multiple satellite communication stations. Satellite management system 310 includes: orbit calculator 312; interference modeling system 314; and interference monitor 316. Satellite management system 310 may include one or more special-purpose or general-purpose processors. Such special-purpose processors may include processors that are specifically designed to perform the functions of the components detailed herein. Such special-purpose processors may be ASICs or FPGAs which are general-purpose components that are electronically and programmatically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). Further, the functions of the components of satellite management system 310 can be hosted on a cloud-computing platform, which is managed by a by a separate cloud-service provider that provides computing and storage resources for clients.

Orbit calculator 312 may serve to output orbital data about one or more satellites for which interference with a communication link between the satellite and a satellite communication station is to be prevented. Orbit calculator 312, for one or more locations, may create orbital data that includes a schedule of when the satellite will be within line of sight of the antenna of a satellite communication station. In some embodiments, a buffer amount of time may be built into the schedule for before and after the satellite enters and exits line of sight of the antenna of the satellite communication station. In some embodiments, orbit calculator 312 may use a two-line element set (TLE) and an associated algorithm that can be used to calculate when a satellite will be within line of sight of the satellite communication station. The algorithm may be considered valid for up to a given time period into the future (e.g., the next six months). Such an algorithm may be adopted by an entity, such as the cellular network operator, to determine when the satellite may be communicating with the satellite communication station. Similarly, the algorithm may also include a buffer amount of time for before and after the satellite enters and exits line of sight of the antenna of the satellite communication station. In other embodiments, system 330 may be required to build in buffer time periods on the front and/or end of the time period during which the satellite and satellite communication station is expected to be communicating.

The orbital data calculated by orbit calculator 312, whether in the form of a schedule or an algorithm, may be provided to system 330. The orbital data may further include indications of the specific frequency bands for which interference needs to be prevented for each satellite or an indication of the satellite, from which system 330 can determine the specific frequency bands for which interference needs to be prevented.

Interference modeling system 314 may model how much interference can be expected at the satellite communication station based on the cellular network. For a region that includes a satellite communication station, system 330 may be required to provide the coordinates of base stations and/or possibly more granular data, such as individual sectors for each base station within the region and/or expected density of UE. Interference modelling system 314 may take into account factors including: earth station antenna gain; earth station antenna pattern; earth station receiver sensitivity; terrain; distance; BS location; UE transmission power levels; BS transmission power levels; other sources of interference; etc. In response to performing modeling, interference modeling system 314 may provide indications of two separate groups of base stations to system 330 for which restrictions are required. The first group may be of base stations for which an entire frequency band is to be blocked when communication between a satellite and a satellite communication station is occurring. The second group may indicate base stations for which only particular PRBs used for uplink communications from UE to the base stations need to be blocked or blanked when communication between the satellite and the satellite communication station is occurring. In some embodiments, a third group may be indicated at base stations for which no blocking or blanking is needed.

Interference monitor 316 may serve to process interference measurements measured at a satellite communication station or received from a satellite at the satellite communication station. Interference data 301 received by interference monitor 316 may be analyzed against multiple thresholds. A lower-power first interference threshold may serve to determine a warning that is passed to system 330; no action may be needed in response to the warning unless the interference increases. A higher-power second threshold may be used to determine an alarm message be sent that requires action to be taken by system 330. Interference monitor 316 may have the ability to decode particular data from interference data 301, such as an indication of which sector of the base station or which base station the UE that produce the interference is communicating with or which base station itself produced the interference.

Network 320 may be used for communication between satellite management system 310 and system 330. Network 320 may include one or more public and/or private networks. Network 320 can include the Internet, over which data is routed.

System 330 can include various components. Such components can include: satellite monitor agent 331; base station map database 332; feedback manager 333; shut down scheduler 334; cellular network interface 335; and orbit database 336. System 330 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). Further, the functions of the components of system 330 can be implemented using a cloud-computing platform, which is operated by a separate cloud-service provider that executes code and provides storage for clients.

Network monitor agent 331 may serve to exchange data with satellite management system 310. If a new base station is added to the cellular network, a base station map database 332 may be updated to include the location (e.g., latitude and longitude coordinates) of the new BS, possibly along with various RF parameters. Network monitor agent 331 may determine whether the base station falls within a region for which modeling is to be performed by satellite management system 310. If so, coordinates of the new base station may be transmitted to satellite management system 310. As part of an initial configuration, the entirety of base station map database 332 or the portion that falls within regions for which modeling is to be performed can be transmitted to satellite management system 310 for interference modelling.

Network monitor agent 331 may also serve to update base station map database 332 with indications of which base stations need to have a particular frequency band blocked and/or have narrower PRB blanking enforced when satellite communications are occurring for a particular satellite communication station. This information may be received by network monitor agent 331 from satellite management system 310 in response to modeling performed using interference modeling system 314. Base station map database 332 may be updated to indicate the frequency bands and/or base stations for which the blocking of a frequency band or PRB blanking is to occur for UE in communication with such base stations.

Additionally, network monitor agent 331 can receive orbital information from orbit calculator 312. The schedule or algorithm provided may be used to update base station map database 332 or may be stored to a separate database, such as orbit database 336. Orbit database 336 may indicate the schedules of transmissions between satellites and satellite communication terminals at various locations. Therefore, orbit database 336 may indicate: a location, a time period for the location, and the satellite that will be making the pass over. In other embodiments, rather than identifying the satellite, the frequency bands used by the satellite may be stored. While separate databases are illustrated for base station map database 332 and orbit database 336, it should be understood that such data can be combined into a single database or split among a greater number of databases.

Shutdown scheduler 334 may use data from base station map database 232 and orbit database 336 to schedule PRB blanking and disablement of frequency bands as dictated by satellite management system 310. Using cellular network interface 335, shut down scheduler 334 may send messages that include network control data 302 to particular base stations (e.g., to the DU of a base station) indicating a time at which PRB blanking is to begin. In some embodiments, a time is also indicated at which PRB blanking is to end. In some embodiments, shut down scheduler 334 executes a timer for a predefined period of time when blanking/disablement is initiated. For example, the amount of time may be known that a satellite remains within line of sight of a satellite antenna for communication. The timer may execute for such a predefined period of time, possibly along with an additional predefined buffer time, such as for a total of 30 minutes. After this timer has expired, the frequency band and/or PRBs can resume being used at the base stations at which disablement and/or blanking occurred. Such a timer may be alternatively executed at some other component of the cellular network, such as at a CU or DUs of the cellular network for the relevant base stations or as a network function with 5G core 139 of FIG. 1. In some embodiments, system 330 may exist external to cellular network 120.

Feedback manager 333 can receive warnings and alarms from satellite management system 310. The warnings and alarms can include identifiers of: specific UE; specific base stations; and/or particular BS sectors. Alternatively, the warnings and alarms may not be indicative of any such identifiers, but may include a general direction of the interference. In yet other situations, no indication of direction of the interference may be provided. Feedback manager 333 may alter the base stations at which PRB blanking occurs for UE or at which the entirety of a frequency band is blocked based on the received warning and alarm feedback. For example, if an alarm indicates a particular base station, that base station may have PRB blanking performed for the next communication session of the satellite with the satellite base station. If PRB blanking was already being performed at the BS for UE in communication with the BS, the entirety of the frequency band may be blocked for both uplink and downlink communication instead. If the feedback indicates a particular UE identifier, feedback manager 333 may use cellular network interface 335 to determine the BS (or sector of the BS) with which the UE was communicating and determine if PRB blanking or disablement of the frequency band should be performed at the BS (or sector of the BS) for future satellite passes. If feedback does not indicate a particular base station or UE, but merely a direction (or even no direction), feedback manager 333 may try PRB blanking for UE at some number of the next geographically closest base stations to see if such changes decrease the interference during future satellite communication sessions with the satellite communication station. Similarly, blocking of the entire frequency band may be tried.

In some embodiments, if interference that is below some defined percentage of the threshold is present, feedback manager 333 may be permitted to eliminate PRB blanking and/or disablement of the frequency band at one or more base stations which were previously designated for blanking/disablement based on modelling. If an alarm is triggered, blanking/disablement may be reinstituted. However, if no alarm is present, blanking/disablement may be discontinued until interference above an alarm threshold occurs. If transitioning a base station from frequency band disablement to PRB blanking triggers a warning, PRB blanking may continue to be used but unlimited use of the frequency band during transmissions may not be attempted. In some embodiments, such an analysis is performed on a sector-by-sector basis, rather than on a BS-by-BS basis.

FIG. 4 illustrates an embodiment of frequency bands and physical resource blocks (PRBs) used by a satellite and a cellular network, respectively. A satellite and satellite communication station may use one or more frequency bands for communication. In some embodiments, it may so happen that at the specific frequency ranges at which communications occur between the satellite and the satellite communication station, the cellular network uses the same frequencies for uplink communications from UE to base stations. In some situations, other frequency ranges, relatively near in frequency but non-overlapping with the specific frequency ranges at which communications occur between the satellite and the satellite communication station, may be used for downlink communications and/or other uplink communications. Such other frequency ranges may also be blocked such as if out of band emissions cause interference.

The frequency bands used for communication with the satellite may be within the frequencies noted by frequency ranges 404 and 408. Frequency ranges 402 and 406 may be used by the cellular network, but not for satellite communication. On the cellular network, these frequency ranges can correspond to PRBs that are used for uplink communications between UE and base stations. As an example, with frequency band 400, which may correspond to band n70 used for 5G communications, PRBs 77-81 may approximately correspond to frequency range 404 and PRBs 121-133 may approximately correspond to frequency range 408. The ranges for which PRBs are blocked may include a high and/or low frequency guard band. In general, cellular network frequency bands may be defined based on the particular cellular technology. For example, if the cellular network is a 5G New Radio (NR) cellular network, frequency bands can include those listed in Table 1. While these bands can be used for 5G NR uplink and downlink communications, 5G may not be the senior user on each band and cellular operations may be required to cease operation at various times if a senior user requires some or all of a frequency band.

TABLE 1

| 5 G NR Band | Uplink (UL) Operating Band | Downlink (DL) Operating Band | Bandwidth |
|---|---|---|---|
| n1 | 1920 MHz-1980 MHz | 2110 MHz-2170 MHz | 60 MHz |
| n2 | 1850 MHz-1910 MHz | 1930 MHz-1990 MHz | 60 MHz |
| n3 | 1710 MHz-1785 MHz | 1805 MHz-1880 MHz | 75 MHz |
| n5 | 824 MHz-849 MHz | 869 MHz-894 MHz | 25 MHz |
| n7 | 2500 MHz-2570 MHz | 2620 MHz-2690 MHz | 70 MHz |
| n8 | 880 MHz-915 MHz | 925 MHz-960 MHz | 35 MHz |
| n20 | 832 MHz-862 MHz | 791 MHz-821 MHz | 30 MHz |
| n28 | 703 MHz-748 MHz | 758 MHz-803 MHz | 45 MHz |
| n38 | 2570 MHz-2620 MHz | 2570 MHz-2620 MHz | 50 MHz |
| n41 | 2496 MHz-2690 MHz | 2496 MHz-2690 MHz | 194 MHz |
| n50 | 1432 MHz-1517 MHz | 1432 MHz-1517 MHz | 85 MHz |
| n51 | 1427 MHz-1432 MHz | 1427 MHz-1432 MHz | 5 MHz |
| n66 | 1710 MHz-1780 MHz | 2110 MHz-2200 MHz | 70/90 MHz |

TABLE 1-continued

| 5 G NR Band | Uplink (UL) Operating Band | Downlink (DL) Operating Band | Bandwidth |
|---|---|---|---|
| n70 | 1695 MHz-1710 MHz | 1995 MHz-2020 MHz | 15/25 MHz |
| n71 | 663 MHz-698 MHz | 617 MHz-652 MHz | 35 MHz |
| n74 | 1427 MHz-1470 MHz | 1475 MHz-1518 MHz | 43 MHz |
| n75 | N/A | 1432 MHz-1517 MHz | 85 MHz |
| n76 | N/A | 1427 MHz-1432 MHz | 5 MHz |
| n77 | 3300 MHz-4200 MHz | 3300 MHz-4200 MHz | 900 MHz |
| n78 | 3300 MHz-3800 MHz | 3300 MHz-3800 MHz | 500 MHz |
| n79 | 4400 MHz-5000 MHz | 4400 MHz-5000 MHz | 600 MHz |
| n80 | 1710 MHz-1785 MHz | N/A | 75 MHz |
| n81 | 880 MHz-915 MHz | N/A | 35 MHz |
| n82 | 832 MHz-862 MHz | N/A | 30 MHz |
| n83 | 703 MHz-748 MHz | N/A | 45 MHz |
| n84 | 1920 MHz-1980 MHz | N/A | 60 MHz |

In some situations, UEs not transmitting on particular PRBs may not be sufficient to prevent interference. For example, out of band emissions that can cause interference with satellite communications may occur if the UE and/or base stations transmit at all within frequency band 400 in the immediate vicinity of a satellite communication station. As such, all PRBs within frequency band 400 may be blocked, thus preventing UE from using such PRBs. Any downlink communications performed by base stations to UE within frequency band 400 may also be moved to another frequency band.

Since PRBs need to be assigned to a UE before the UE uses them for uplink data transmissions, to block a particular range of PRBs from use by UE, a base station does not assign such PRBs to any UE for uplink transmissions. Therefore, for example, if PRBs 77-81 for frequency range 404 are to be temporarily blocked from use, a base station does not assign these PRBs to UE for use. Similarly if the entirety of frequency band 400 needs to be blocked, the relevant base station does not assign any PRBs within frequency band 400 to UE and the base station does not use any portion of frequency band 400 for downlink transmissions to the UE. If a phone call is active with a UE using a frequency band that is to be disabled, prior to ceasing to assign PRBs to UE within the frequency band, a reassignment to a different primary frequency band for the UE conducting active calls is performed to prevent the calls from being dropped.

Figure 5:
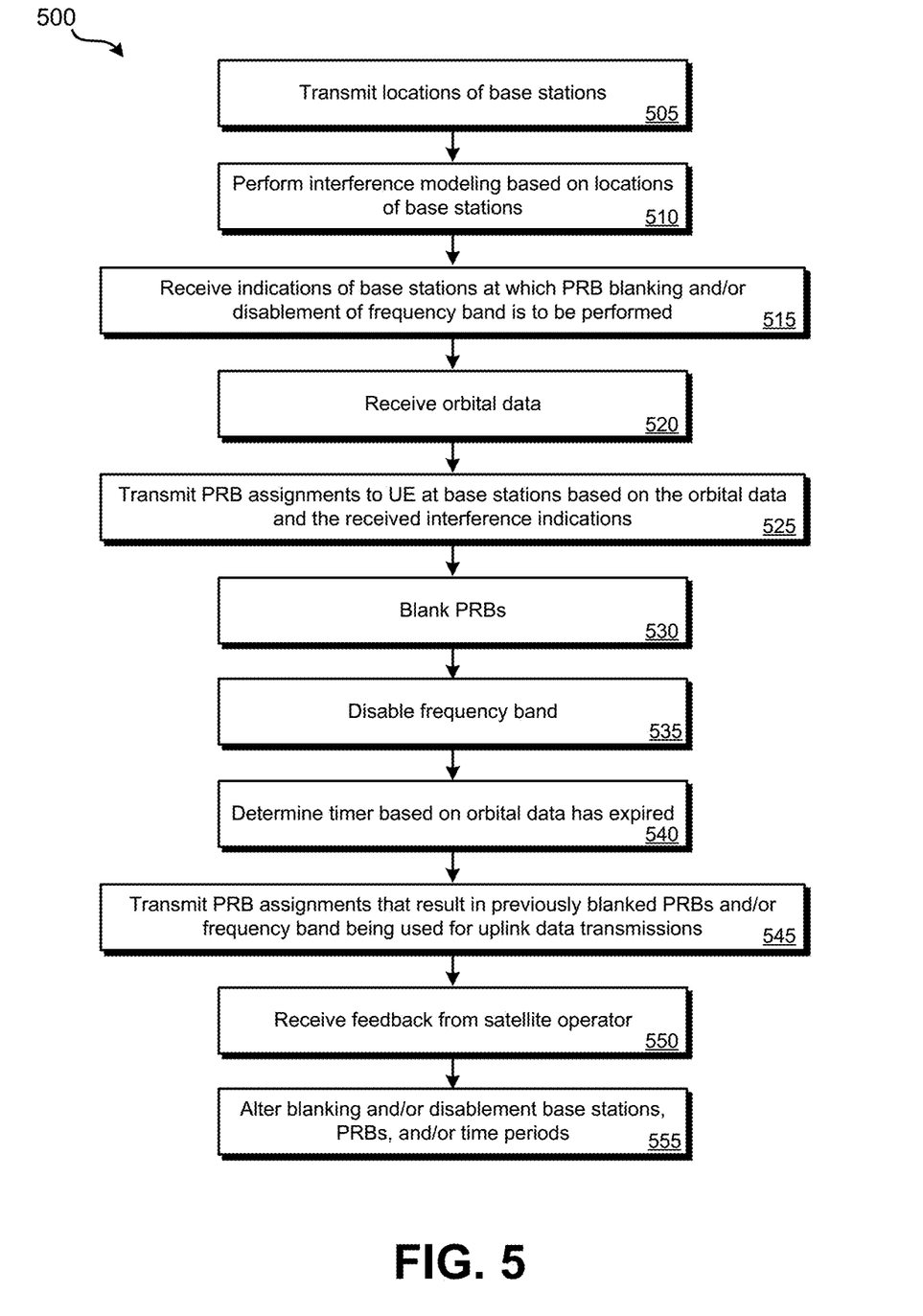
FIG. 5 illustrates an embodiment of a method for performing dynamic physical resource blanking on a cellular network.

Various methods may be performed using the systems and arrangements detailed in relation to FIGS. 1-4. FIG. 5 illustrates an embodiment of a method for performing dynamic physical resource blanking on a cellular network. The blocks of method 500 can be performed using system 300 of FIG. 3, which can be integrated with system 100 of FIG. 1. Method 500 functions under the assumption that the satellite operator has senior use rights to a frequency band and that the operator of the cellular network is required to prevent the cellular network from interfering with the satellite operator's use of the frequency band.

At block 505, the locations of a cellular network's base stations can be provided, by the cellular network, to a system that performs interference simulation or modelling on behalf of a satellite operator. In some embodiments, the satellite operator may define geographic regions, such as regions around satellite communication stations. The cellular network may only be required to provide locations of base stations within these defined geographic regions. The size of the geographic location may be at least in part based on the gain, sensitivity, and directionality of the satellite ground station and its antenna. Therefore, the size and shape of the geographic region can vary by satellite communication station and antenna. In some embodiments, the modelling is instead performed by the operator of the cellular network.

At block 510, modeling (which can also be referred to as simulation) may be performed to determine the amount of interference uplink communications between UE and the base stations of block 505 may cause with satellite communication stations. The modeling may also take into account interference originating directly from base stations, such as due to downlink communications from the base stations to UE. The modeling may take into account: the likely locations and density of UE; the sectors of the base stations; the power level at which UE and the base stations are expected to transmit; the angling of the antennas of the base stations; terrain; distance; buildings; and the frequencies at which UE and the base stations transmit. The modelling may also take into account the antenna radiation patterns of the base stations and the satellite communication station.

At block 515, the based on the modeled amount of interference, a first set of base stations are identified at which UE should be prevented from transmitting on certain frequency ranges. A second set of base stations are identified at which no communication should be performed across an entire frequency band, including downlink and uplink communications. In some embodiments, it may so happen that, at the specific frequency ranges at which communications occur between the satellite and the satellite communication station, the cellular network may use such frequencies for uplink communications from UE to base stations. Other frequency ranges, relatively near in frequency but non-overlapping with the specific frequency ranges at which communications occur between the satellite and the satellite communication station, may be used for downlink communications and/or uplink communications. Such other frequency ranges may also need to be blocked if out of band emissions causes or could cause interference for the satellite communication link. In some embodiments, a third set of base stations is identified at which no blocking needs to be performed.

At block 520, orbital data can be received by the cellular network or, more specifically, by the cellular network interference management system. The orbital data can include a schedule, which can include: a satellite identifier; one or more frequency range identifiers; and/or a start and end time for when the satellite will be within line of sight of the satellite communication station (or when the communication link will be active). The orbital data may include buffer times being built into the start and end time and/or the frequency ranges, or the cellular network operator may be required to build in such buffers. The schedule may be provided in the form of a batch for multiple satellite communication sessions of the satellite and/or for multiple satellites or individually for each satellite communication session.

In other embodiments, the orbital data can include an algorithm that can be used to calculate a satellite's fly-over of the satellite communication station (or for multiple stations and/or satellites). Indications may be included with the orbital data of which frequency ranges need to be block and/or satellite identifiers. The algorithm may be valid for up to a predefined amount of time, such as one month.

At block 525, based on the orbital data and the indications received at block 515, blanking instructions may be sent by the cellular network interference management system to relevant base stations. The blanking instructions can indicate: a start time for blanking; specific PRBs that are to be blanked; an indication of whether an entire frequency band is to be disabled; and an end time for blanking. In some embodiments, a timer for a predefined duration of time is executed at the base station (or higher level cellular network component) or directly at the cellular network interference management system rather than sending an end time. The indication of whether the entire frequency band is to be disabled can be sent in the form of an instruction that indicates every PRB within the frequency band is to be blanked.

At block 530, the PRBs are blanked to prevent interference by the relevant base stations to which the instructions were transmitted not assigning the PRBs to UE. Other PRBs at the base stations may still be assigned to UE within the frequency band and, possibly, downlink communications at other frequencies by the base station may be permitted. At block 535, at the relevant base stations, the entire frequency band is disabled by all PRBs within the frequency band not being assigned to UE. If all PRBs are blocked from being assigned to UE, any downlink communications within the frequency band may also be blocked.

If all PRBs are disabled on a frequency band, UE that are using the frequency band as their primary communication frequency band may be transitioned to another frequency band prior at the relevant base stations prior to the frequency band being blocked. For example, if an active phone call is ongoing at a UE involving a base station at which the entirety of the frequency band is to be disabled, the UE may be transitioned to using another primary frequency band to avoid the call being dropped.

At block 540, if a timer is used to determine when the satellite is no longer in communication with the satellite communication station, a determination may be made at the cellular network (e.g., at the cellular network interference management system) when the timer has expired. For example, it may be known that 30 minutes after a start time of when blanking is to occur, the satellite has ended communication with the satellite communication station. A message may be transmitted to base stations at which particular PRBs or the entirety of the frequency band were disabled indicating that use of the PRBs and frequency band is now permitted. Alternatively, this determination may be made locally at the base stations based on an end time or locally executed timer.

At block 545, the base stations may be transmitting PRB assignments that overlap with the previously blocked frequency bands used for satellite communication. The UE may then transmit uplink data on the PRBs to the base stations. The base stations may also reassign various UE to use the frequency band as their primary frequency band. For example, UE that used the frequency band as its primary frequency band prior to block 535 may again be assigned such that the frequency band is primary.

During satellite communications, the satellite communication station may monitor interference, such as against one or more thresholds. At block 550, feedback may be received from the satellite operator, such as from satellite management system 310. The feedback may indicate interference, if present, that must be addressed, such as in the form of an alarm. The feedback may also indicate one or more warnings that do not require modifications to the cellular network operation, but should be monitored. The feedback may indicate base station identifiers, sector identifiers, UE identifiers, and/or a general location, if available.

At block 555, based on the feedback, the cellular network interference manager system may perform PRB blanking and/or disablement of the entirety of the frequency band at one or more additional base stations. Additionally or alternatively, the range of PRBs blanked may be increased and/or the time period for which blanking/disablement occurs can be increased. If little or no interference feedback is received, the cellular network interference manager system may cease PRB blanking and/or enable the frequency band at one or more base stations which the cellular network interference manager system determines are unlikely to cause interference. Additionally or alternatively, if little or no interference feedback is received, the range of PRBs blanked may be decreased and/or the time period for which blanking/disablement occurs can be decreased.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for performing dynamic resource blanking on a cellular network, the method comprising:
   receiving, by the cellular network, interference modelling from a satellite operator that operates a satellite;
   receiving, by the cellular network, orbital data for the satellite, wherein:
      the satellite utilizes a first frequency band; and
      the orbital data is indicative of an orbit of the satellite around Earth;
   determining, by the cellular network, a plurality of user equipment (UE) each conducting an active call using a second frequency band at one or more base stations in response to the orbital data for the satellite;
   for each UE of the plurality of UE, performing, by the cellular network, a handover of the active call to a different frequency band; and
   based upon the orbital data for the satellite, the interference modelling, and following completion of the handover, disabling, by the cellular network, the second frequency band at the one or more base stations.

2. The method for performing dynamic resource blanking on the cellular network of claim 1, further comprising:
   receiving, by the cellular network, from an operator of the satellite, interference feedback.

3. The method for performing dynamic resource blanking on the cellular network of claim 2, further comprising:
   in response to the interference feedback, blanking, by the cellular network, a plurality of physical resource blocks (PRBs for uplink communication with a plurality of base stations.

4. The method for performing dynamic resource blanking on the cellular network of claim 2, further comprising:
   in response to the interference feedback, assigning a base station to disable the second frequency band for future pass-overs of the satellite.

5. The method for performing dynamic resource blanking on the cellular network of claim 2, further comprising:
   in response to the interference feedback, blanking, by the cellular network, a plurality of PRBs at a plurality of base stations.

6. The method for performing dynamic resource blanking on the cellular network of claim 1, wherein the cellular network is a 5G New Radio (NR) cellular network.

7. The method for performing dynamic resource blanking on the cellular network of claim 1, wherein the orbital data is indicative of a schedule of when the satellite is within a line of sight of a satellite receiver base station.

8. The method for performing dynamic resource blanking on the cellular network of claim 1, wherein the orbital data is indicative of an algorithm for calculating when the satellite is within a line of sight of a satellite receiver base station.

9. The method for performing dynamic resource blanking on the cellular network of claim 1, further comprising:
   initiating, by the cellular network, a satellite pass-over timer based on the orbital data;
   determining, by the cellular network, that the satellite pass-over timer has expired; and
   based upon determining the satellite pass-over timer having expired, enabling, by the cellular network, the second frequency band at the one or more base stations.

10. The method for performing dynamic resource blanking on the cellular network of claim 1, further comprising:
    initiating, by the cellular network, a satellite pass-over timer based on the orbital data;
    determining, by the cellular network, that the satellite pass-over timer has expired; and
    based upon determining the satellite pass-over timer having expired, assigning, by the cellular network, a plurality of physical resource blocks (PRBs) for uplink communication with a plurality of base stations.

11. A cellular network system, comprising:
a 5G New Radio (NR) cellular network comprising a first plurality of base stations;
a cellular network interference management system that functions as part of the 5G NR cellular network, the cellular network interference management system configured to:
receive interference modelling from a satellite operator that operates a satellite;
receive orbital data for the satellite, wherein:
the satellite utilizes a first frequency band; and
the orbital data is indicative of an orbit of the satellite around Earth;
determine a plurality of user equipment (UE) each conducting an active call using a second frequency band at the one or more base stations in response to the orbital data for the satellite;
for each UE of the plurality of UE, perform a handover of the active call to a different frequency band; and
based upon the orbital data for the satellite, the interference modelling, and following completion of the handover, cause the second frequency band to be disabled at one or more base stations of the 5G NR cellular network.

12. The cellular network system of claim 11, further comprising:
a satellite management system, operated by the satellite operator, that provides interference feedback to the cellular network interference management system.

13. The cellular network system of claim 12, wherein the cellular network interference management system is further configured to cause the 5G NR cellular network to blank a plurality of physical resource blocks (PRBs) for uplink communication with a second plurality of base stations in response to the interference feedback.

14. The cellular network system of claim 12, wherein the cellular network interference management system is further configured to cause the 5G NR cellular network to assign a base station of the first plurality of base stations to disable the second frequency band for future pass-overs of the satellite in response to the interference feedback.

15. The cellular network system of claim 12, wherein the cellular network interference management system is further configured to cause the 5G NR cellular network to:
blank a second plurality of PRBs at the first plurality of base stations in response to the interference feedback.

16. The cellular network system of claim 11, wherein the orbital data is indicative of a schedule of when the satellite is within a line of sight of a satellite receiver base station.

17. The cellular network system of claim 11, wherein the 5G NR cellular network is further configured to:
initiate a satellite pass-over timer based on the orbital data;
determine that the satellite pass-over timer has expired; and
based upon determining the satellite pass-over timer having expired, enable the second frequency band at the one or more base stations.

18. The cellular network system of claim 11, wherein the 5G NR cellular network is further configured to:
initiate a satellite pass-over timer based on the orbital data;
determine that the satellite pass-over timer has expired; and
based upon determining the satellite pass-over timer having expired, assign a plurality of physical resource blocks (PRBs) for uplink communication with the first plurality of base stations.

* * * * *

UNITED STATES PATENT AND TRADEMARK OFFICE
CERTIFICATE OF CORRECTION

| | | |
|---|---|---|
| PATENT NO. | : 12,009,905 B2 | |
| APPLICATION NO. | : 17/550390 | |
| DATED | : June 11, 2024 | |
| INVENTOR(S) | : Aravind Anchala et al. | |

It is certified that error appears in the above-identified patent and that said Letters Patent is hereby corrected as shown below:

In the Claims

In Claim 3, Column 16, Line 25, please add ")" after (PRBs

Signed and Sealed this
Sixteenth Day of July, 2024

Katherine Kelly Vidal
*Director of the United States Patent and Trademark Office*